Patented Nov. 5, 1935

2,019,837

UNITED STATES PATENT OFFICE 2,019,837

CHLORO-BENZOYLAMINO-ANTHRAQUINONE

Alexander J. Wuertz, Carrollville, and William Dettwyler, Milwaukee, Wis., assignors to E. I. du Pont de Nemours & Company, Wilmington, Del., a corporation of Delaware No Drawing. Application June 22, 1934, Serial No. 731,883

4 Claims. (Cl. 260—60)

This invention relates to the preparation of new chloro derivatives of 1,8-dibenzoylamino- and 1-benzoylamino - 8 - chloro - anthraquinones having the general formula:

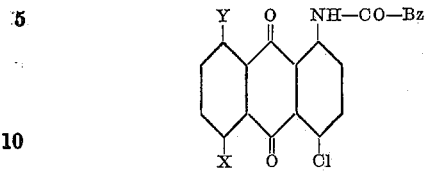

wherein Bz stands for a radical of the benzene series, X represents either hydrogen or chlorine and Y stands for either chlorine or the group —NH—CO—Bz, in which Bz has the same meaning as above given.

We have found that new chloro derivatives of 1-benzoylamino-8-chloro-anthraquinone and 1,8-dibenzoylamino-anthraquinone can be obtained in substantially pure form and in high yields when these compounds are chlorinated in nitrobenzene or other inert high-boiling solvents and acetic acid, and in the presence of an acid binding agent such as sodium or potassium acetate, and that the chloro bodies so produced are valuable intermediates for the preparation of dyestuffs.

This general method for the chlorination of benzoyl-amino-anthraquinone compounds is more specifically described in U. S. Patent 1,963,109, by A. J. Wuertz, who has disclosed that the chlorination of 1-benzoylamino-anthraquinones in a mixture of an inert high-boiling solvent and acetic acid gives exceptionally pure chlorination products. The use of acetic acid tends to slow down the chlorination and causes a smooth reaction which can be readily controlled.

We have found this procedure to be of particular value in the chlorination of 1,8-dibenzoyl-amino-anthraquinone, wherein the chlorination may be controlled to give a 1,8-dibenzoylamino-4-chloro- or 4,5-dichloro-anthraquinone in exceptionally pure form and also in the chlorination of 1-benzoylamino-8-chloro-anthraquinone to produce either 1-benzoylamino-4,8-dichloro- or 1-benzoylamino-4,5,8-trichloro - anthraquinones in substantially pure form and in good yields. By this procedure the introduction of 1 or 2 atoms of chlorine into the starting material is readily controlled. The first atom introduced into the 1-benzoylamino-8-chloro-anthraquinone enters the 4 position, giving substantially a pure 1-benzoylamino-4,8-dichloro-anthraquinone, substantially free from the 4,5,8-trichloro body. Further chlorination gives the 4,5,8-trichloro-anthraquinone. So also in the chlorination of 1,8-dibenzoylamino-anthraquinone, a substantially pure mono-alpha-chloro-1,8-dibenzoylamino-anthraquinone is obtained before any substantial amount of dichlorination takes place, thereby permitting the preparation of high grade products without resort to costly separation procedures.

This process also makes it possible to start with the diamino- or amino-chloro-anthraquinone which can be first benzoylated in the inert high-boiling organic solvent, and then chlorinated without isolation.

The following examples are given to more fully illustrate our invention. Parts used are by weight.

Example 1

Suspend 50 parts of 1,8-dibenzoyldiamino-anthraquinone in 250 parts of dichlorobenzene and add 250 parts of acetic acid and 25 parts of fused sodium acetate. Heat to 95° C. and pass in chlorine gas until a sample contains 7.5% chlorine. The 1,8-dibenzoyldiamino-4-chloro - anthraquinone is filtered off and washed with alcohol and water. It is thus obtained as bright yellow needles.

Example 2

Suspend 50 parts of 1,8-dibenzoyldiamino-anthraquinone in 250 parts of nitrobenzene and 250 parts of acetic acid. Then add 25 parts of fused sodium acetate, heat to 100° and pass in chlorine gas until a sample contains 13.8% chlorine. Cool, filter and wash with alcohol and water. The product thus obtained is in the form of long yellow needles and comprises substantially pure 1,8-dibenzoylamino-4,5-dichloro-anthraquinone.

Example 3

To 250 parts of nitrobenzene and 100 parts of 8-chloro-1-amino-anthraquinone are added at 150° C. 60 parts of benzoyl chloride. The mass is held at 150° C. for 2 hours and cooled to 100°, at which temperature 250 parts of acetic acid and 60 parts of fused ground sodium acetate are added. A stream of chlorine gas is then passed in at 95–100° C. until a sample analyzes 24.5% chlorine. The benzoylamino compound which is originally in the form of yellow plates is gradually changed to fine yellow needles. The isolated product contains 3 chlorine atoms, and is substantially pure 1 - benzoylamino - 4,5,8 - trichloro-anthraquinone.

Example 4

Add to 300 parts of o-dichlorobenzene and 100 parts of 8-chloro-1-amino-anthraquinone, at 140° C., 62 parts of benzoyl chloride. Hold at 140° C. for 1 hour and cool to 100° C. Add 300 parts of acetic acid and 60 parts of fused sodium acetate. Pass in chlorine gas at 100° C. until a sample analyzes 18.0% chlorine. Cool, filter and wash with alcohol and water. The 1-benzoyl-amino-4,8-dichloro-anthraquinone is thus obtained in pure form as yellow needles.

In the process as disclosed in the foregoing examples, any inert high-boiling organic solvent may be used, such as nitrobenzene, trichloroethylene, mono-, di- and trichlorobenzene, etc.

While the above examples have been given to illustrate the preferred method for preparing these new chloro-benzoylamino-anthraquinone compounds, it should be understood that other methods of chlorination may be used, although we have found that the above procedures give exceptionally high grade products in relatively high yields. Substituted benzoyl chloride, such as the chloro, methyl or nitro benzoyl chloride may be used in place of benzoyl chloride, and the resulting Bz-substituted benzoylamino compounds may be chlorinated in the manner above described and are contemplated within the scope of our invention. Other acidyl amino-anthraquinones such as the 1-acetylamino-8-chloro- and 1,8-diacetyl-diamino-anthraquinone may be chlorinated in a similar manner. The acetyl compounds are particularly suitable where it is desired to produce the free amine compounds after chlorination.

What we claim is:

1. A process for preparing alpha-chloro-benzoylamino-anthraquinones which comprises chlorinating a compound of the class consisting of compounds having the formula

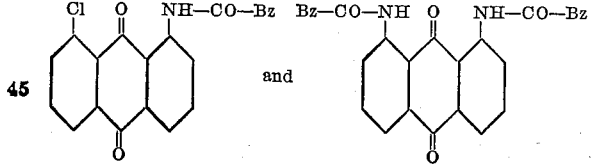

and wherein Bz in all cases stands for a radical of the benzene series; in an inert high-boiling solvent in the presence of acetic acid and an acid binding agent.

2. Benzoylamino - chloro - anthraquinones of the following formula

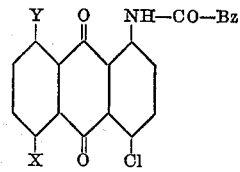

wherein Bz represents a radical of the benzene series, X stands for chlorine or hydrogen and Y stands for chlorine or another —NH—CO—Bz radical wherein Bz has the same meaning as above given.

3. A chlorinated 1-benzoylamino-anthraquinone of the formula

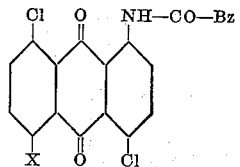

wherein X represents hydrogen or chlorine, and Bz stands for a radical of the benzene series.

4. A chlorinated 1,8-dibenzoylamino-anthraquinone of the formula

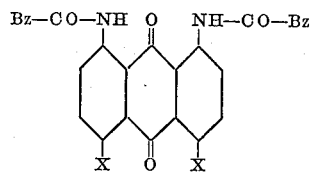

wherein at least one X represents chlorine, and Bz stands for a radical of the benzene series.

ALEXANDER J. WUERTZ.
WILLIAM DETTWYLER.